UNITED STATES PATENT OFFICE.

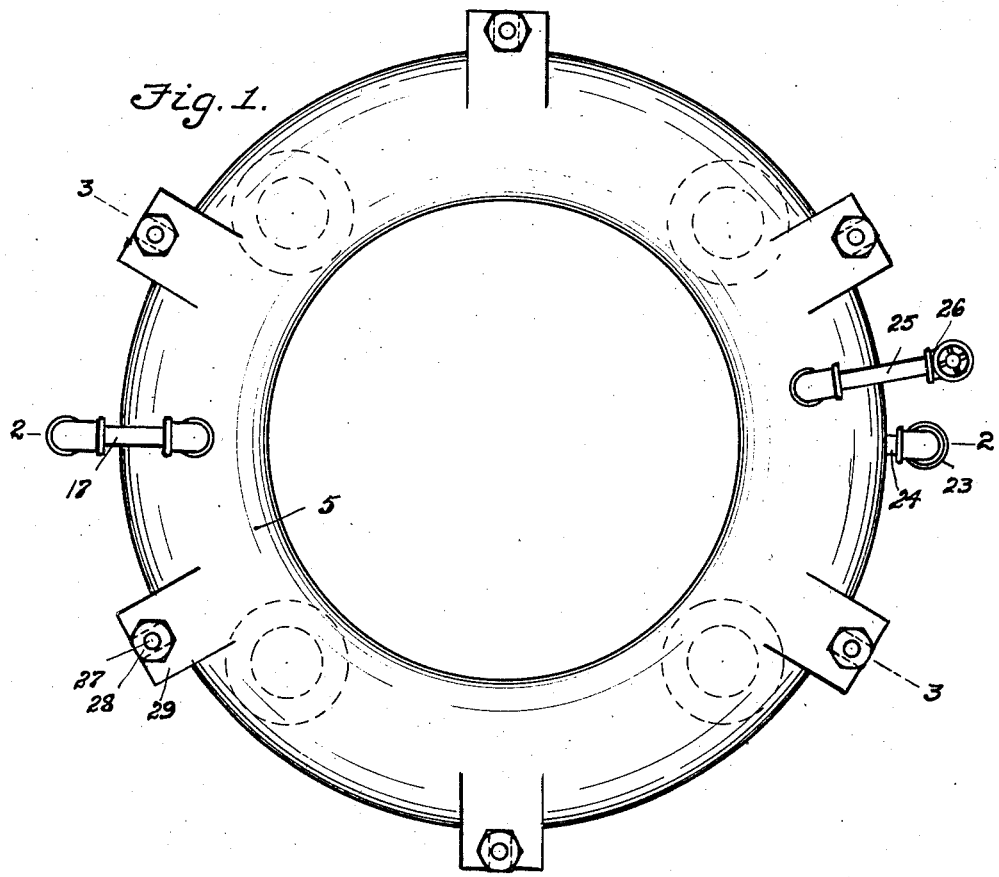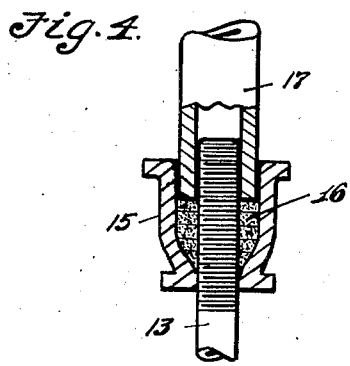

CLYDE L. SMITH AND EMMETT S. WEBSTER, OF SOUTH BEND, INDIANA, ASSIGNORS, BY MESNE ASSIGNMENTS, TO SMITH ONE HEAT SYSTEM, OF SOUTH BEND, INDIANA, A CORPORATION OF INDIANA.

TIRE-VULCANIZING MOLD.

1,358,120.   Specification of Letters Patent.   Patented Nov. 9, 1920.

Application filed August 15, 1919. Serial No. 317,717.

*To all whom it may concern:*

Be it known that we, CLYDE L. SMITH and EMMETT S. WEBSTER, citizens of the United States, residing at South Bend, in the county of St. Joseph and State of Indiana, have invented certain new and useful Improvements in Tire - Vulcanizing Molds, of which the following is a specification.

The invention relates to a tire curing or vulcanizing mold, and more especially to molds adapted for vulcanizing new tires in the process of manufacture.

The object of the invention resides in the provision of a sectional mold which may be easily and quickly assembled in operative relation, and the steam supply and exhaust connections of which will be automatically coupled under the influence of the clamping action in forcing the mold sections together, thereby effecting a material saving of time and labor in the manipulation of the mold, and incidentally reducing the expense ordinarily involved in the vulcanizing process. Another object resides in the simplification of the steam supply and exhaust connections, whereby a single steam supply pipe and a single exhaust pipe will be common to both of the mold sections, the respective coupling points of the pipes between the sections being such that the union and separation thereof takes place without the manipulation of any parts.

With the above and other objects in view, the invention in the preferred form of details will be described in the following specification, reference being had particularly to the accompanying drawings, in which:—

Figure 1 is a plan view of a mold embodying the improvements.

Fig. 4 is a detail sectional view of the pipe coupling means employed.

Figure 2:
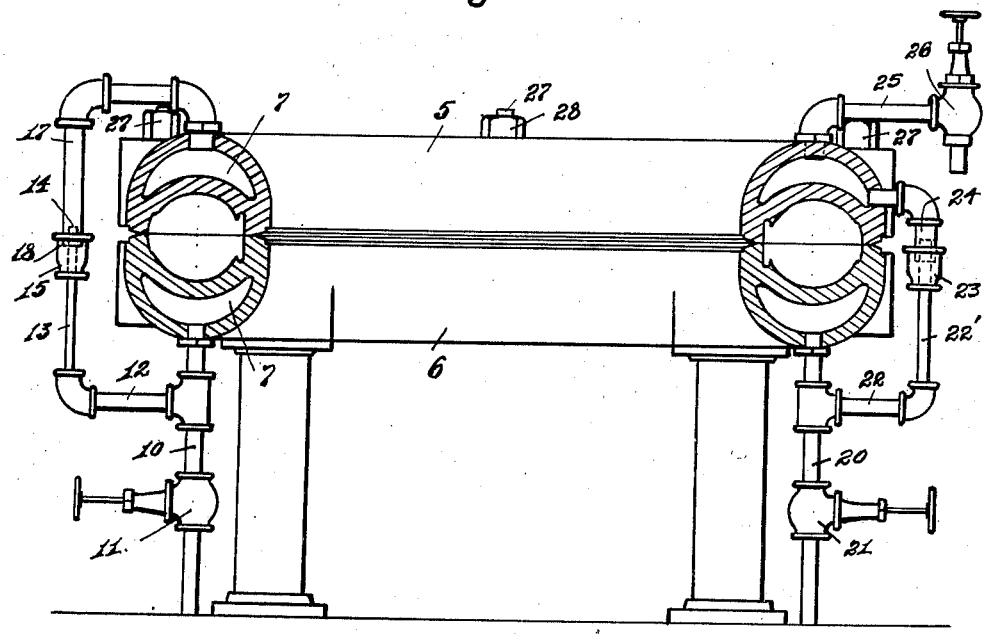
Fig. 2 is a sectional view thereof taken on the line 2—2 of Fig. 1.
Figure 3:
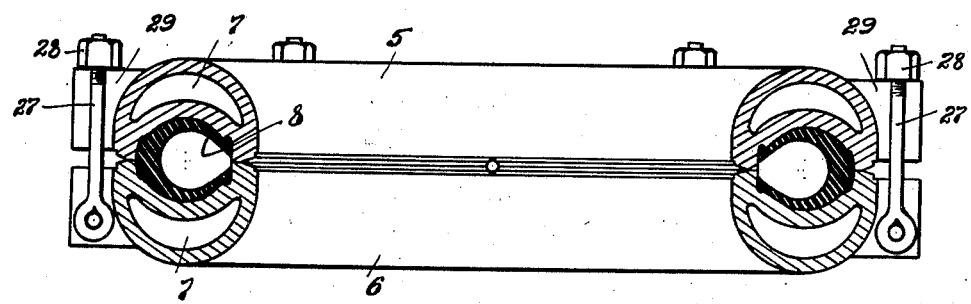
Fig. 3 is a similar view taken on the line —3 of Fig. 1.

As illustrated, the mold consists of two complementary annular sections 5 and 6, each of hollow construction to provide a steam chamber 7, and each of which has an inner side formation which, when the sections are in operative relation, forms a mold cavity of the desired form for shaping the tire to be vulcanized. In practice, an air bag (not shown) is placed within the tire to expand the same under pressure so as to take the form of the mold cavity, a tire so formed being indicated at 8 in Fig. 3. The process of vulcanizing the rubber stock of the tire by the heat of steam is well understood in the art, and a detailed explanation thereof is deemed unnecessary for the purposes of the present invention.

As the mold is steam heated and the sections thereof separable to permit the unvulcanized tire to be placed therein, separation of the mold sections necessarily involves a separation or uncoupling of the steam supply and exhaust pipes when the sections have connection with a single steam supply pipe, and the exhaust pipes have connection with a pipe common to both. The coupling and uncoupling of such pipes, especially in the use of threaded couplings, is a more or less laborious and time consuming job. The present improvement contemplates a structure which will permit the mold sections to be separated or joined without any manual manipulation being required precedent to or subsequent to such action for similarly permitting a separation of or union of the steam supply and exhaust pipes. To this end, the lower mold section has a permanent connection through the pipe 10 with a source of steam supply, with a valve 11 for controlling the flow. A branch pipe 12 extends laterally of the steam pipe 10, from which a relatively smaller pipe 13 extends vertically, its free end terminating at 14. Screw-threaded upon the end of the pipe 13, so as to be adjustable thereon, is a cup-shaped union 15, which is sufficiently larger than the diameter of the pipe 13 so as to provide a sufficient space therebetween for the reception of a packing material 16 of a resilient nature, such as rubber or the like. Communicating with the chamber of the upper mold section, and extending outwardly and downwardly therefrom, is a pipe 17, the free end of which terminates at 18, and which is of sufficient internal diameter to receive and pass over the end of the pipe 13, as plainly shown in Fig. 4. The spacing between the relative ends of the pipes 13 and 17 is such that, when the mold sections are drawn into operative relation, the end of the pipe 17 will enter the cup-shaped union 15 in the manner shown in Fig. 4, and compress the packing material 16 therein sufficiently to form a steam tight joint or coupling.

Permanently connected with the lower mold section and in communication with the steam chamber thereof, is an exhaust pipe 20 for exhausting the steam and draining the water of condensation from the mold chambers, which may be controlled by a suitable valve 21. A branch pipe 22 extending laterally of the pipe 20 is provided with a relatively smaller upwardly extending pipe 22', terminally screw-threaded for adjustably mounting a cup-shaped union 23, the interior diameter of the union being sufficient to permit packing material, such as rubber, to surround the pipe 22' and to be pocketed within the union. Having communication with the chamber of the upper mold section and extending downwardly therefrom, is a pipe 24 of sufficient bore to snugly receive the end of the pipe 22', and enter the union, so as to effect a butt end contact with the packing material therein to form a tight joint, all in the same manner as above noted with relation to the steam supply connections. A steam relief pipe 25, controlled by a valve 26, permits steam to be exhausted from the mold chambers without resort to the connections for the like purpose just described.

The mold sections are designed to be drawn together by means of draw bolts 27 pivoted to one of the sections, and provided with nuts 28 which engage slotted lugs 29 on the other mold section.

It will be apparent from the foregoing that the steam supply and exhaust pipes of the respective mold sections form a union in drawing the sections into operative relation, and separate with the parting of the mold sections, thus requiring no manipulation or use of tools to effect such union or disconnection. The mold may thus be manipulated with celerity and with a material saving of time and labor, whereby the expense of vulcanizing tires as compared with many of the mold structures now in common use is materially reduced.

While the foregoing is the preferred form of the invention, it is to be understood that the invention is not limited to the precise structure shown and described, as it is obvious that the same may be variously modified without departing from the spirit of the invention.

What is claimed is:—

1. A tire vulcanizing mold including a pair of chambered mold sections, and separable steam supply pipes in communication with each mold section involving means for effecting a union therebetween by establishing a butt-end seal under pressure exerted incident to drawing the mold sections into operative relation.

2. A tire vulcanizing mold including a pair of chambered mold sections, and separable steam supply pipes in communication with each mold section involving means for effecting a union therebetween by establishing a butt-end seal under pressure exerted incident to drawing the mold sections into operative relation, said means being adjustable to vary the pressure to influence the sealing action.

3. A tire vulcanizing mold including a pair of chambered mold sections adapted to form a tire receiving cavity, independent inlet and exhaust pipes on each section in communication with the chambered portion thereof, cup-shaped members terminally mounted on one inlet and one exhaust pipe, a resilient packing material disposed within the said members, and means for drawing the mold sections into operative relation and incidentally force the ends of the other inlet and exhaust pipes into end contact with the packing within said members, whereby to establish communication and effect a tight union between the complementary inlet and exhaust pipes.

4. A tire vulcanizing mold including a pair of chambered mold sections, separable fluid supply pipes in communication with each mold section, a cup-shaped member terminally mounted on one of said pipes, a resilient gasket disposed within said member, and means for drawing the mold sections together and incidentally force the end of the other pipe into end contact with the gasket within the cup member, whereby to effect a union between the respective ends of said pipes.

5. A tire vulcanizing mold including a pair of chambered mold sections, separable fluid supply pipes in communication with each mold section, a cup-shaped member terminally mounted on one of said pipes, a resilient gasket disposed within said member, and means for drawing the mold sections together and incidentally press the end of the other pipe into end contact with the gasket within the cup member, said means being adjustable to vary the relation of the parts in effecting the union thereof.

In testimony whereof we affix our signatures.

CLYDE L. SMITH.
EMMETT S. WEBSTER.